(12) United States Patent
Monson et al.

(10) Patent No.: US 7,242,840 B1
(45) Date of Patent: Jul. 10, 2007

(54) METHOD AND APPARATUS FOR THE INTEGRATION OF A VCSEL FLEX WITH A PARALLEL OPTICAL TRANSCEIVER PACKAGE

(75) Inventors: Robert J. Monson, St. Paul, MN (US); Richard L. Cellini, St. Michael, MN (US); Jianhua (Jack) Yan, Prior Lake, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 157 days.

(21) Appl. No.: 10/773,098

(22) Filed: Feb. 5, 2004

Related U.S. Application Data (63) Continuation-in-part of application No. 10/640,583, filed on Aug. 13, 2003, now Pat. No. 7,035,521.

(51) Int. Cl.
*G02B 6/00* (2006.01)
(52) U.S. Cl. .................. 385/134; 385/135; 385/92
(58) Field of Classification Search ................ 385/134, 385/136
See application file for complete search history.

(56) References Cited

U.S. PATENT DOCUMENTS

| | | | |
|---|---|---|---|
| 4,548,466 A | 10/1985 | Evans et al. | |
| 4,973,158 A * | 11/1990 | Marsh | 356/247 |
| 5,343,548 A | 8/1994 | Hall et al. | |
| 6,056,448 A * | 5/2000 | Sauter et al. | 385/92 |
| 6,471,419 B1 | 10/2002 | Hall et al. | |
| 6,767,141 B1 | 7/2004 | Dudek et al. | |
| 6,851,867 B2 * | 2/2005 | Pang et al. | 385/134 |
| 6,896,421 B2 * | 5/2005 | Monson et al. | 385/136 |
| 6,902,329 B2 * | 6/2005 | Monson et al. | 385/88 |
| 6,921,215 B2 * | 7/2005 | Catchmark et al. | 385/92 |
| 7,035,521 B2 * | 4/2006 | Monson et al. | 385/136 |
| 2003/0223702 A1 * | 12/2003 | Mitchell | 385/92 |
| 2005/0036754 A1 * | 2/2005 | Monson et al. | 385/136 |

* cited by examiner

*Primary Examiner*—Frank G. Font
*Assistant Examiner*—James P. Hughes
(74) *Attorney, Agent, or Firm*—Brooks & Cameron, PLLC (57) ABSTRACT

A method of integrating an optoelectronic device, for example a vertical cavity surface emitting laser, onto the electronic substrate of a parallel optical transceiver package by positioning and maintaining the exact relative alignment of the optoelectronic device relative to the electronic substrate for application of adhesive and curing. The method includes the utilization of a multi-piece fixture which clamps the elements into position and maintains position throughout the curing process. Alternatively, the fixture can comprise a unitary assembly for clamping the elements into position and maintaining their position throughout the curing process.

8 Claims, 10 Drawing Sheets

METHOD AND APPARATUS FOR THE INTEGRATION OF A VCSEL FLEX WITH A PARALLEL OPTICAL TRANSCEIVER PACKAGE

PRIORITY CLAIM

This application is a continuation-in-part application of prior application Ser. No. 10/640,583, filed Aug. 13, 2003 now U.S. Pat. No. 7,035,521.

FIELD OF THE INVENTION

The present invention relates to a method for the integration of an optoelectronic device, with a parallel optical transceiver package, and more particularly to integrating a vertical cavity surface emitting laser with the electronic interface substrate of the parallel optical transceiver package. The invention further relates to an assembly tool for the above-described method utilizing a fixture which aligns the VCSEL with the electronic interface substrate and maintains the relative position of the components for adhesive application and curing.

BACKGROUND OF THE INVENTION

There is a need for high-speed cost effective optical transmitters which can operate as parallel communications data links. The primary function of the optical transmitter is to translate electrical signals into optical signals which are carried over a fiber optic path. The optical transmitter includes an optoelectronic device, such as a vertical cavity surface emitting laser (VCSEL).

Connection of the optoelectronic device with the electronic interface substrate of the package is complicated due to geometric constraints. The VCSEL emits light in a generally perpendicular direction to the plane of the optical fibers and substrate, therefore making stacking of such components difficult. To solve the packaging problem, the VCSEL is either mounted parallel to the substrate and the output photons directed 90° through mirrors or the VCSEL is mounted perpendicular to the substrate and the electric interface connectors are rotated 90°. The optical bending solution is less than optimal due to the difficult optical design and mirror alignment required. Conversely, the bending of electrical conductors is well known in the art through the implementation of flexible circuits. Therefore, flexible electrical circuits capable of achieving the necessary 90° bend are generally the accepted solution.

There is a need then for a manufacturing method which allows for efficient positioning of the flexible circuit on the electronic interface substrate and maintaining that position during the curing of the adhesive. The problem of alignment and bending of the flexible circuit are exacerbated as data rates of optoelectronic devices increase. Closer connections must be established in order to retain electrical performance levels. The placement and bending of the flexible surface on the substrate is typically performed manually by a skilled technician just prior to application of a bonding adhesive. Unfortunately, the existing techniques employed in connection with this process are time consuming, expensive and prone to failure due to misalignment. If the placement of the flexible circuit fails to align with the substrate connectors, the entire component may need to be scrapped. While manual bending and aligning techniques exist for mounting an optoelectronic device to the substrate, it would be desirable to improve the efficiency and reduce the cost of coupling.

SUMMARY OF THE INVENTION

The present invention is a method and integration tool for the alignment and placement of an optoelectronic device onto the electronic interface substrate of a parallel optical transceiver package. The tool is comprised of a clamp assembly and a VCSEL retaining member. An example of suitable VCSEL retaining members includes a spring or rocker plate. The clamp assembly positions the VCSEL with the flexible circuit disposed on the electronic interface substrate. Once positioned, the VCSEL is held in place by means of the VCSEL retaining member pushing against the blind side of the VCSEL. The clamp assembly is preferably constructed of a metal such as aluminum to facilitate the curing process, which may require elevated temperatures.

The present invention provides a cost efficient method for aligning and connecting an optoelectronic device to the electronic interface circuitry of the package. It is essential that the exact alignment of the VCSEL position be maintained throughout the assembly process. The present invention enables repeatable and consistent placement of the flexible circuit onto the electronic substrate. The integration method maintains the integrity of the VCSEL flex circuit connection while reducing the time intensive manual component of assembly. Furthermore, the mechanical aspect of the process provides a reliable means of duplicating successful placement, thus increasing the output of properly aligned assemblies.

In a preferred embodiment, the optoelectronic devices are VCSEL arrays to which a flexible circuit is attached. The flexible circuit contains electrical traces on one side which provide current pathways to the VCSEL from the integrated circuits of the package. The flexible circuit extends from the VCSEL and is attached to a spacer block so that the electrical traces may be attached to the parallel optical transceiver package.

In an embodiment of the present inventions the VCSEL is placed within a recess in the spring clamp frame of the clamp assembly with the flexible circuit extending toward the electronic substrate. The clamp base and spring clamp frame are then loosely fastened over the parallel optical transceiver package. Relative position is maintained by a support element of the clamp base which is inserted into the optical connector port of the parallel optical transceiver package. Lateral motion is further restricted by a projecting flange of the clamp base which caps the spring clamp frame. The completed fixture, when properly positioned, is fixed by a threaded fastener. The VCSEL is held in place by a flat spring pinning the VCSEL to a support element of the clamp base. Adhesive is applied and the entire system allowed to cure.

In an alternative embodiment, the clamp assembly comprises a unitary assembly in which the clamp base and spring clamp frame are hingedly connected to rotatably interface with the VCSEL and the parallel optical transceiver package.

In another alternative embodiment, the clamp assembly comprises a clamp base hingedly connected to a rocker plate clamp frame. The rocker plate clamp frame can include a mounting recess to which the VCSEL is positioned. The clamp assembly further comprises a rocker plate disposed on the rocker plate clamp frame. The rocker plate includes resilient members to fixedly retain the VCSEL during the mounting recess. The rocker plate can further include a resilient member to forcibly position the VCSEL flex circuit against the parallel optical transceiver package clamp assembly during a bonding process.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances, well-known methods, procedures, components and circuits have not been described in detail so as to not to unnecessarily obscure aspects of the present invention.

The present invention is a tool and method for the integration of an optoelectronic device to a parallel optical transceiver package. Fiber optic transmitter and receiver electrical elements are implemented on two separate substantially parallel boards. The boards are disposed substantially perpendicular to the base of the optoelectronic device. A flexible circuit is bent 90° in order to join the optoelectronic device to the electrical circuitry of the parallel optical package.

In the preferred embodiment, the present invention is used for the integration of a vertical cavity surface emitting laser (VCSEL) within a parallel optical transceiver package. In this geometric configuration, light emitted from the surface of the VCSEL laser is oriented nominally along a plane parallel to the substrate. This is the preferred direction for the optical portion of the package because the optical cable can then extend parallel to the substrate thus allowing multiple packages to be stacked.

A flexible circuit, bent at a substantially right angle, is used to electrically connect pads on the substrate to pads on the optoelectronic dies, which are oriented perpendicular to the substrate. The flexible circuit has leads defined in one single layer protected by a sheet of insulating material. At a first end of the flexible circuit, bonds are used for the connection to the optoelectronic dies. At the opposing end an array of large pads provides landing sites. After the flexible circuit is secured in its aligned position in the cavity of the substrate, each of its leads are electrically connected to corresponding pads on the substrate by a series of wire bonds.

Accurately aligning the bonding sites on the substrate to the flexible circuit is a challenging step. Too great an offset between bonding sites can effect wire bond yields and process time and create a high inductance electrical subsystem, due to the longer wires and higher wire loops required to accommodate a large lateral offset. It should be noted that placement errors could impact the amount of noise introduced into the system, possibly making the system not functional. However, these placement errors can be kept to a minimum through the careful design and assembly of component parts using the present invention.

Figure 1:
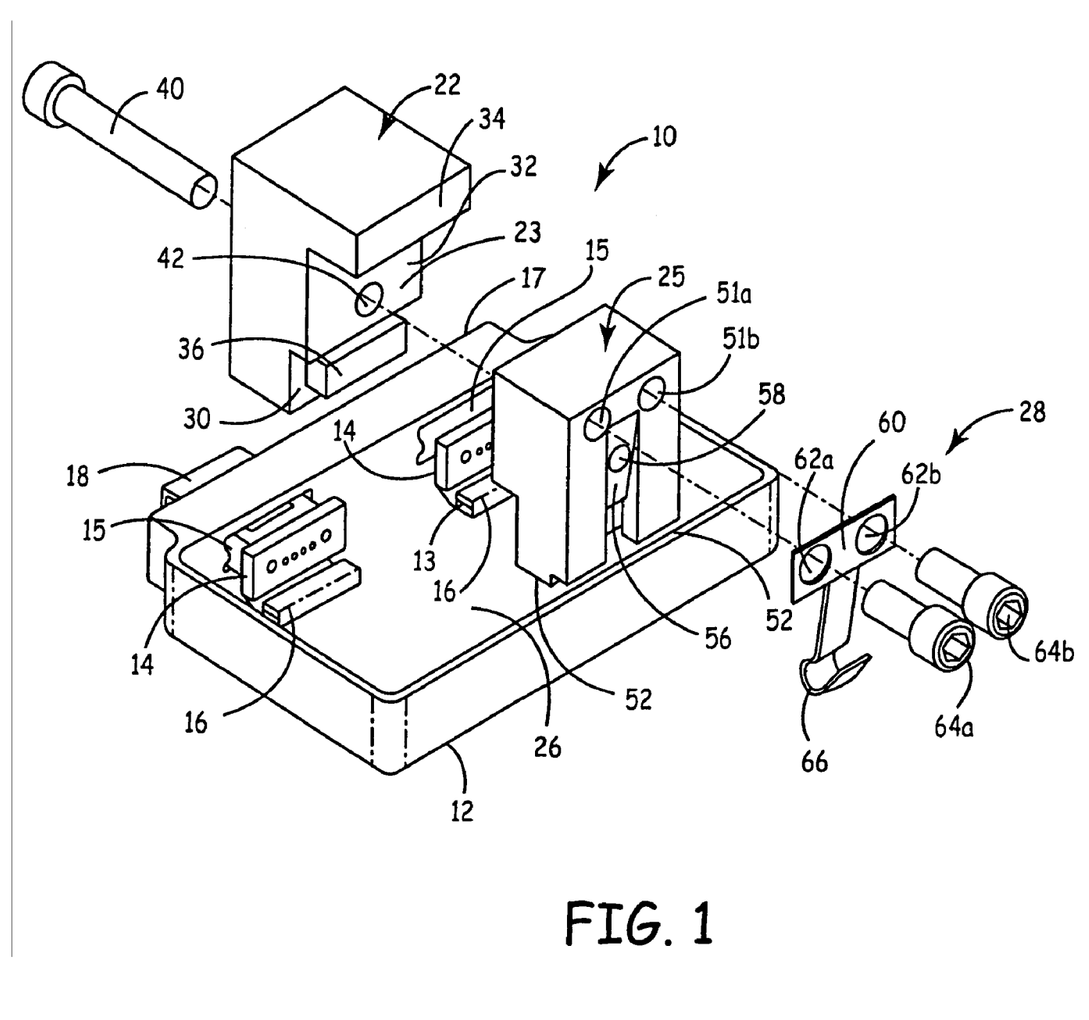
FIG. 1 is a perspective view of a laser package integration tool with a parallel optical package in place.

An optoelectronic device integration tool 10, in accordance with the present invention, is constructed as shown in FIGS. 1–6. FIG. 1 is an exploded perspective view of the optoelectronic device integration tool 10, which provides for alignment of the optoelectronic device, and a parallel optical transceiver package 12. In a first embodiment, the optoelectronic device 10 is comprised of a vertical cavity surface emitting laser (VCSEL) 14, the active face of which is mounted on a flexible circuit 16.

As illustrated by FIG. 1, a single optoelectronic device integration tool 10 integrates a single VCSEL 14 with the parallel optical transceiver package 12. It is possible for a pair of tools 10 to be used simultaneously. The present invention requires that integration of VCSEL 14 occurs prior to the alignment and connection of the fiber optic assembly 18. Note that FIG. 1 includes an illustration of a completed system in the first port with an integrated VCSEL 14 and connected fiber optic assembly 18 and the second port contains a VCSEL 14 in the process of integration by tool 10.

The optoelectronic device integration tool 10 is substantially a clamp comprised of two separate blocks, which are preferably machined from aluminum or another metal suitable for said bonding and alignment. The optoelectronic device integration tool is designed to position and immobilize the VCSEL 14, with flexible circuit 16, and electrical spacer block 13 relative to the parallel optical transceiver package 12. The frame for the spring clamping element 28 is the clamp base 22 and the spring clamp frame 25. The clamp base 22 and spring clamp frame 25 have the same uniform width. The optoelectronic device integration tool 10 straddles the parallel optical transceiver package 12 so as to position spring clamp 28 for contact with VCSEL 14.

Figure 2:
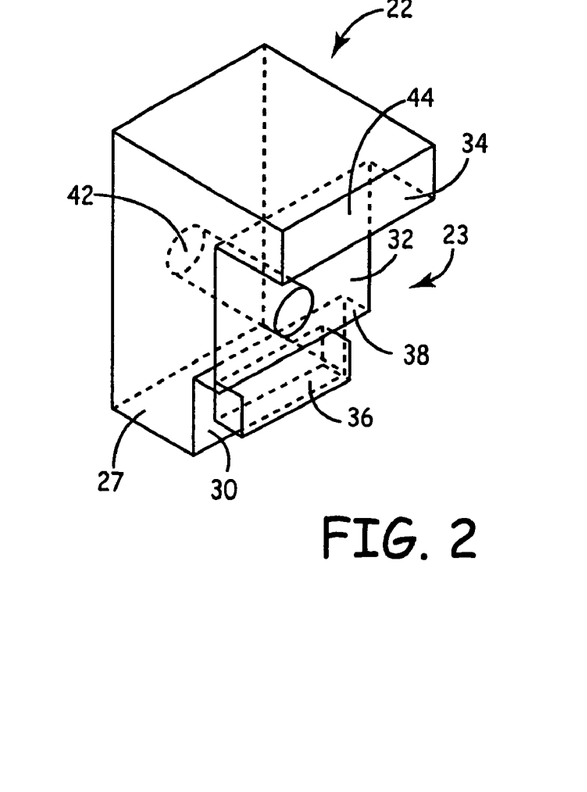
FIG. 2 is an isometric view of the clamp base block of the present invention

The clamp base 22, as illustrated in FIG. 2, includes on the proximal side 23 a package engaging face 30, a spring block mating face 32, and a spring block flange 34. Opposing distal face 24 is a vertical wall with a single opening for insertion of fastener screw 40 into fastener screw hole 42. The rectangular foot 27 of clamp base 22 sits outside parallel optical transceiver package 12 during operation.

On proximal face 23, package engaging face 30 mates with the exterior face of package frame 17. Protruding from package engaging face 30 is VCSEL support 36, which is a rectangular block projection, sized for insertion into the MT connector port 15 of the parallel optical transceiver package 12. It is envisioned that VCSEL support 36 is dimensioned to replicate the connector portion of fiber optic assembly 18. The VCSEL support 36 extends proximally toward spring clamp frame 25 and stabilized clamp base 22 due to the close dimensioning of VCSEL support 36 and MT connector port 15. Additional stability is provided by package cap 38, that projects over package frame 17 perpendicular to package engaging face 30.

Figure 3:
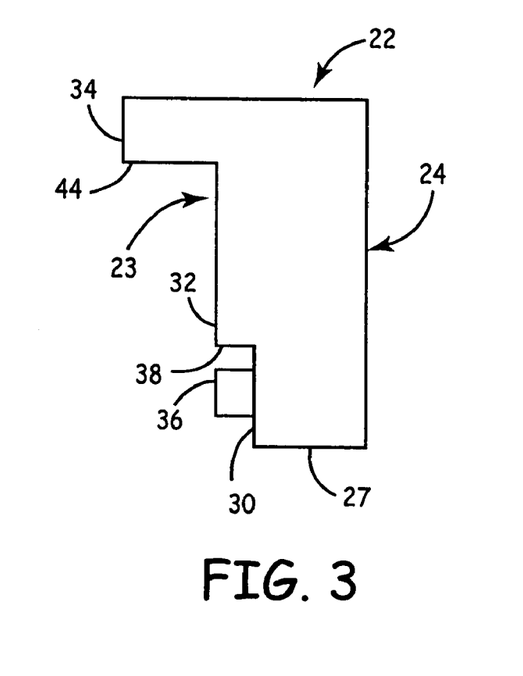
FIG. 3 is a side view of the clamp base block of the present invention.

As illustrated in FIG. 3, spring block mating face 32 extends vertically from the distal end of package flange 38. Fastener screw hole 42 is set within face 32. Spring block mating face 32 abuts the complimentary face on spring clamp frame 25 when fastener 40 joins the blocks. Spring block flange 34 extends perpendicular to spring block-mating face 32 to form a cap over spring clamp frame 25. Flange face 44 rests on spring clamp frame 25 to prevent rotational movement and for alignment on the electronic interface substrate 26.

Figure 4:
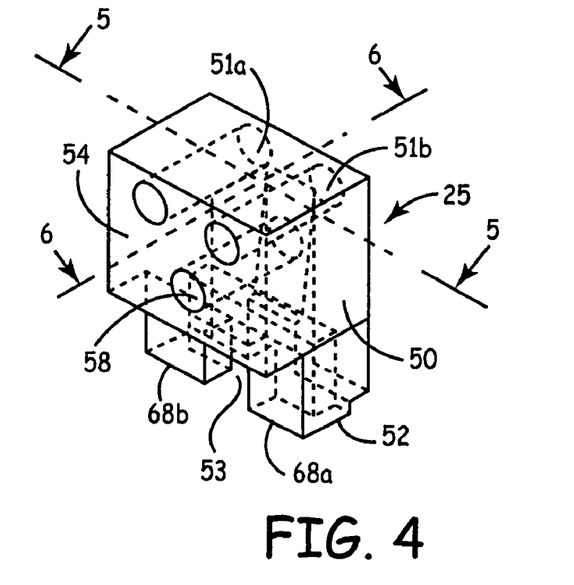
FIG. 4 is an isometric view of the spring clamp block of the present invention.
Figure 5:
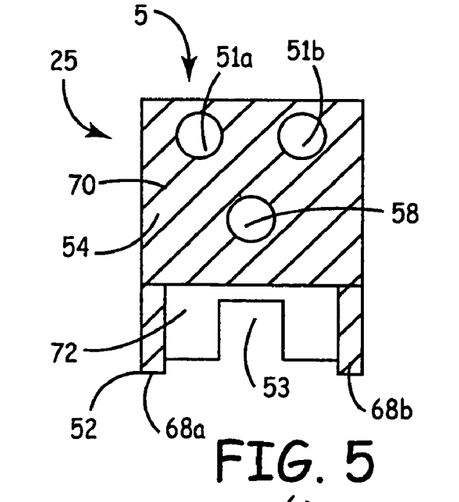
FIG. 5 is a sectional side view of the spring clamp block of the present invention.
Figure 6:
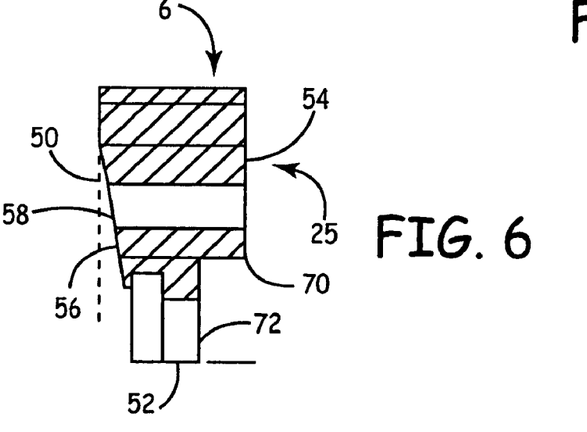
FIG. 6 is a side view of the spring clamp block of the present invention.

As illustrated in FIGS. 4–6, spring clamp frame 25 includes three operative faces; distally disposed spring clip face 50, spring block base 52, and spring block mating face 54. Spring clamp frame 25 has generally a horseshoe shape with bottom center open for access to the flexible circuit 16 and electronic substrate 26. Spring clip face 50 includes a pair of horizontal clip holes 51a, 51b at the upper end for attaching flat spring 60. Flat spring channel 56, which is inclined proximally toward spring block mating face 54, is centered between clip holes 51a and 51b and extends toward electronic substrate 26. Threaded clamp fastener hole 58 extends horizontally from spring block mating face 54 through the lower portion of flat spring channel 56.

As illustrated in FIG. 1, flat spring 60 is generally "T" shaped with fastener holes 62a and 62b aligned horizontally at the top. Threaded fasteners 64a, 64b extend through holes 62a, 62b into horizontal clip holes 51a, 51b. The lower end of flat spring 60 contains a proximally projecting curl 66 for contact with the blind face of VCSEL 14. The width of spring curl 64 is slightly less than the width of spring channel 56. The slope of channel 56, combined with the radius of projecting curl 66, provide the required force to maintain VCSEL 16 position. FIG. 6 is a sectional view of FIG. 4 taken along line 6—6. As illustrated in FIG. 6, in a first embodiment, the slope of channel 56 is 8° from vertical.

Spring block base 52 includes two "L" shaped legs 68a, 68 b disposed below spring block mating face 54 and extending distally. The footprint of the present invention is intentionally minimized so as not to interfere with components of the electronic substrate 26. Moreover, spring block base 52 must provide access for attaching the flexible circuit 16.

FIG. 5 is a sectional view from FIG. 4 taken along line 5—5. As illustrated in FIG. 5, spring block mating face 54 is comprised of an upper vertical surface 70 and lower vertical surface 72. Upper vertical surface 70 includes clamp fastener hole 58 and spring holes 51a and 51b. Lower vertical surface 72 is set back from upper vertical surface 70 to allow for placement of the package frame 17 and a recess for VCSEL 14.

In operation, the optoelectronic device integration tool 10 is applied as follows. Parallel optical transceiver package 12 is disposed on a work surface (not shown). The VCSEL 14 is inserted onto lower vertical surface 72 of spring clamp frame 25. Clamp base 22 and spring clamp frame 25 are then loosely mated by inserting VCSEL support 36 through MT connector port 15 while maintaining the position of flexible circuit 16 on substrate 26. Fastener screw 40 is then inserted through screw hole 42 of clamp base 22 and threadably engages clamp fastener hole 58 of spring clamp frame 25. VCSEL 14 is now clamped between the projecting curl 66 of flat spring 60 and VCSEL support 36. Adhesive is applied to the interface between electronic substrate 26 and flexible circuit 16. In the alternative, adhesive may be applied as the first step. Note that at this point the VCSEL 14 is not attached to MT connector 18.

Figure 7:
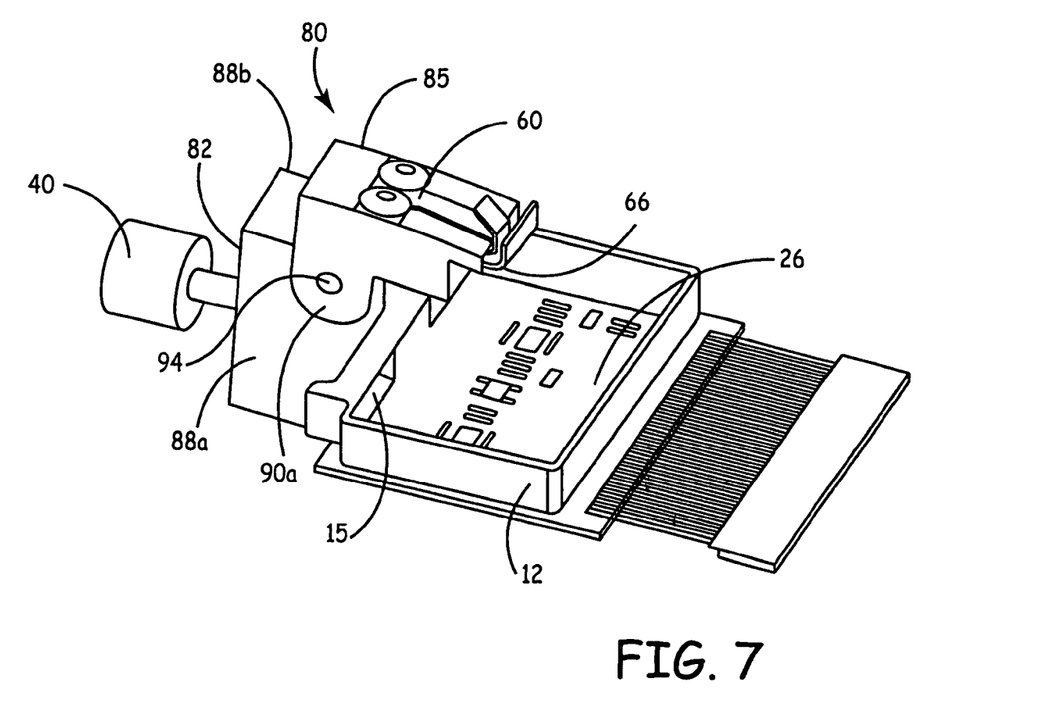
FIG. 7 is a perspective view of an embodiment of a laser package integration tool with a parallel optical package in place.
Figure 8:
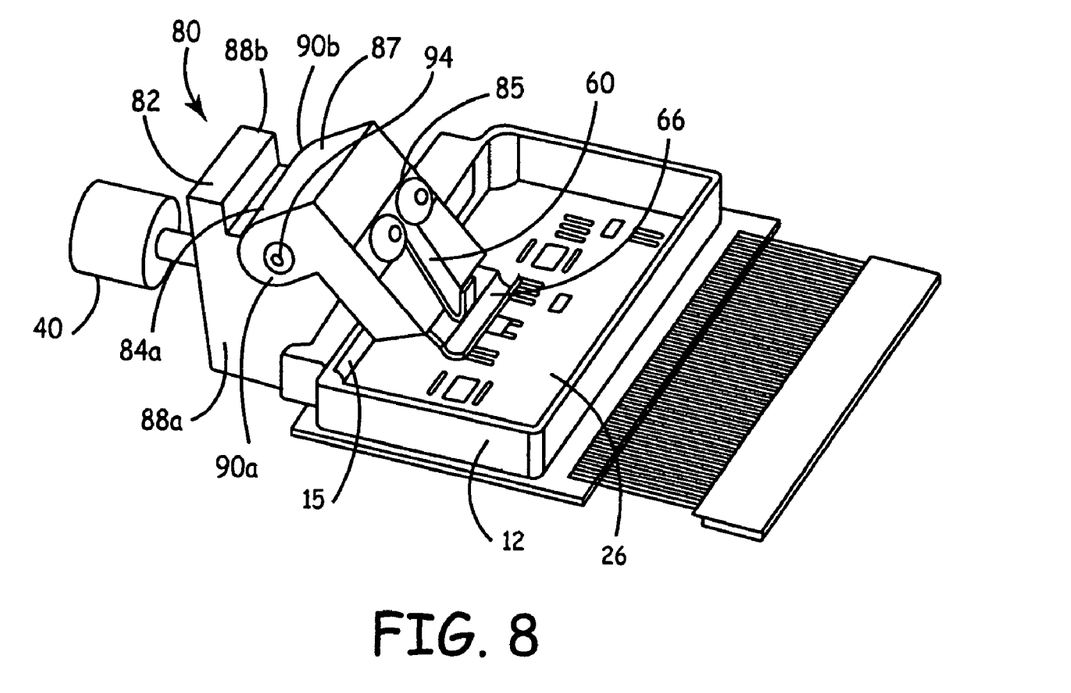
FIG. 8 is a perspective view of an embodiment of a laser package integration tool with a parallel optical package in place.
Figure 9:
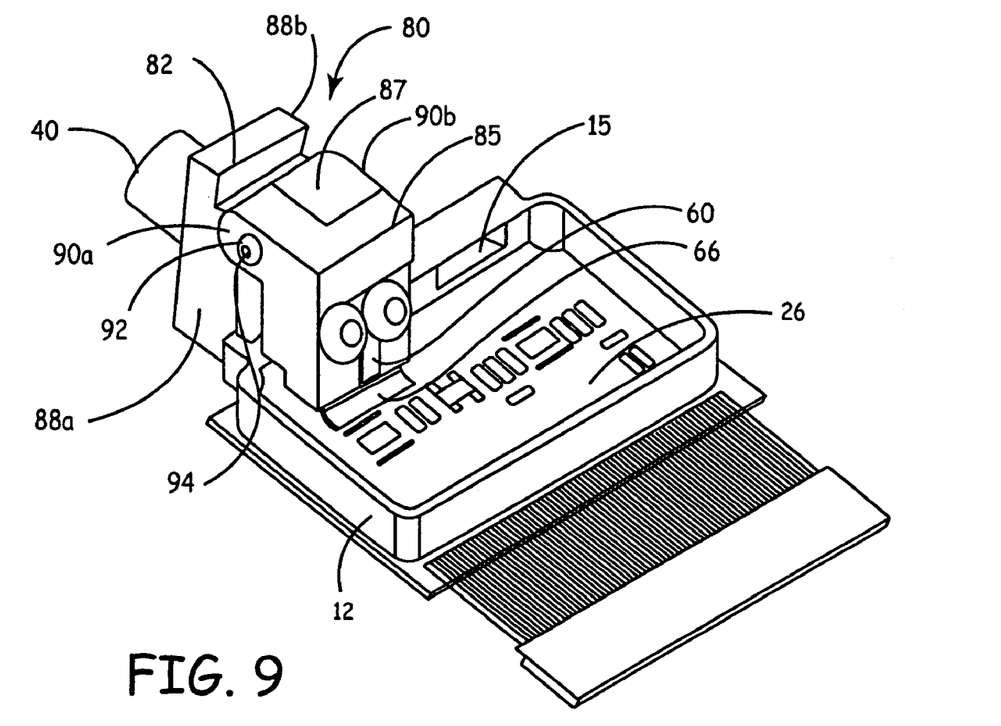
FIG. 9 is a perspective view of an embodiment of a laser package integration tool with a parallel optical package in place.
Figure 10:
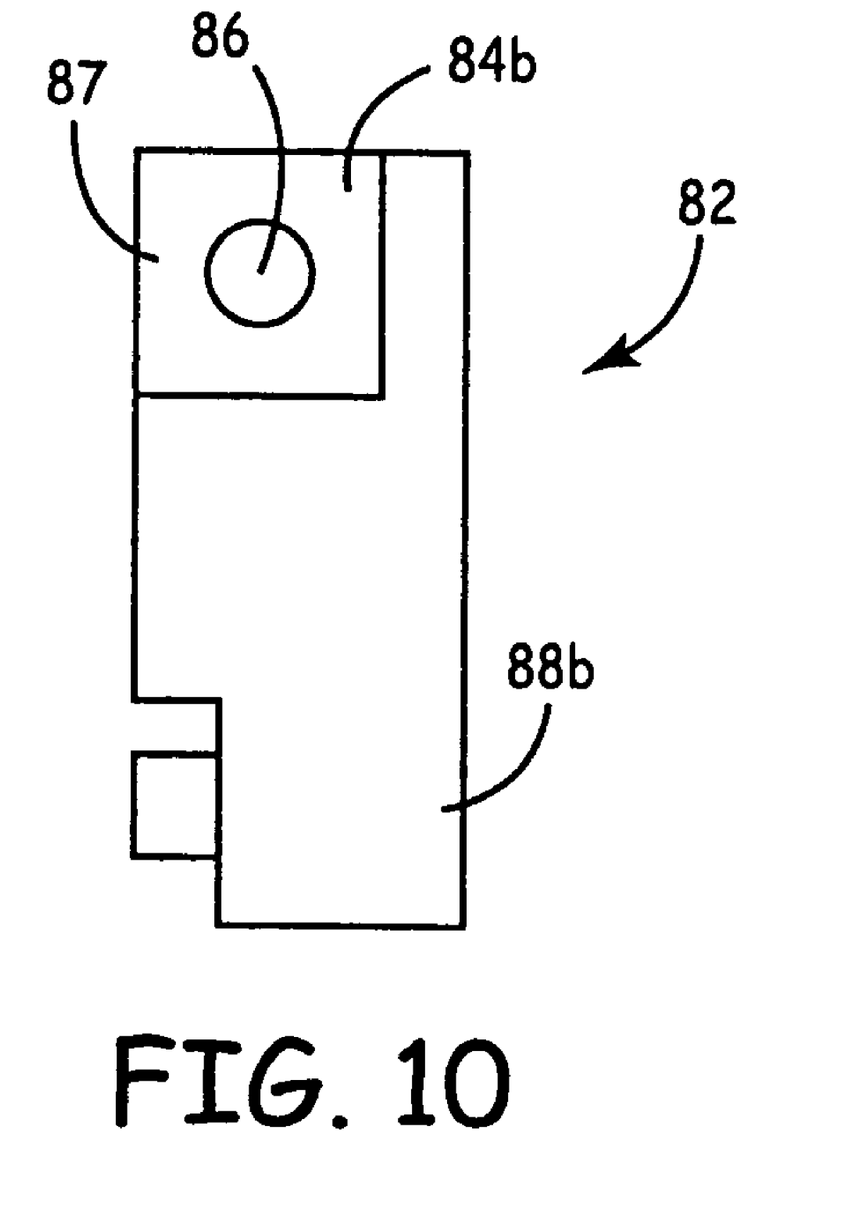
FIG. 10 is a side view of an embodiment of a clamp base of the present invention.

As illustrated in FIGS. 7, 8 and 9, an alternative embodiment of a single optoelectronic device integration tool 80 can take the form of a unitary assembly. As depicted, tool 80 comprises a clamp base 82 and a spring clamp frame 85. Clamp base 82 and spring clamp frame 85 are preferably machined from aluminum or another metal suitable for use during bonding and alignment of the fiber optic assembly 18. Clamp base 82 preferably includes many of the features previously described and illustrated in FIGS. 2 and 3 with reference to clamp base 22 with the additional inclusion of a pair of recessed surfaces 84a, 84b defining a mounting wall 87. Mounting wall 87 includes a throughbore 86 as shown in FIG. 10 connecting recessed surfaces 84a, 84b. Spring clamp frame 85 preferably includes many of the features previously described and illustrated in FIGS. 4, 5, and 6 with reference to spring clamp frame 25 with the additional inclusion of a pair of projecting arms 90a, 90b, each arm including a bore 92. Preferably, spring clamp frame 85 has a width equal to clamp base 82 while projecting arms 90a, 90b are spaced apart such that mounting wall 87 is accommodated within projecting arms 90a, 90b with the bores 92 in alignment with throughbore 86. A hinge pin 94 can then be inserted through bores 92 and throughbore 86 allowing for rotational interaction between clamp base 82 and spring clamp frame 85 around hinge pin 94. In an alternative embodiment of the single optoelectronic device integration tool 80, throughbore 86 can be replaced with a pair of partial bores, one on each side of mounting wall 87, while hinge pin 94 can be replaced with a pair of hinge pins.

In operation, the single optoelectronic device integration tool 80 performs a similar function as previously described with respect to the single optoelectronic device integration tool 10. In general, the parallel optical transceiver package 12 is disposed on a work surface (not shown). The VCSEL 14 is inserted into the lower vertical surface 72 of spring clamp frame 84. VCSEL support 36 on clamp base 82 is inserted into MT connector port 15 while maintaining the position of flexible circuit 16 on substrate 26. Spring clamp frame 85 is rotated downwardly around hinge pin 94 such that projecting curl 66 of flat spring 60 clamps VCSEL 14 against VCSEL support 36. Fastener screw 40 is then inserted through screw hole 42 of clamp base 82 and threadably engages clamp fastener hole 58 of spring clamp frame 85. Adhesive is then applied to the interface between electronic substrate 26 and flexible circuit 16. In the alternative, adhesive may be applied as the first step.

Figure 13:
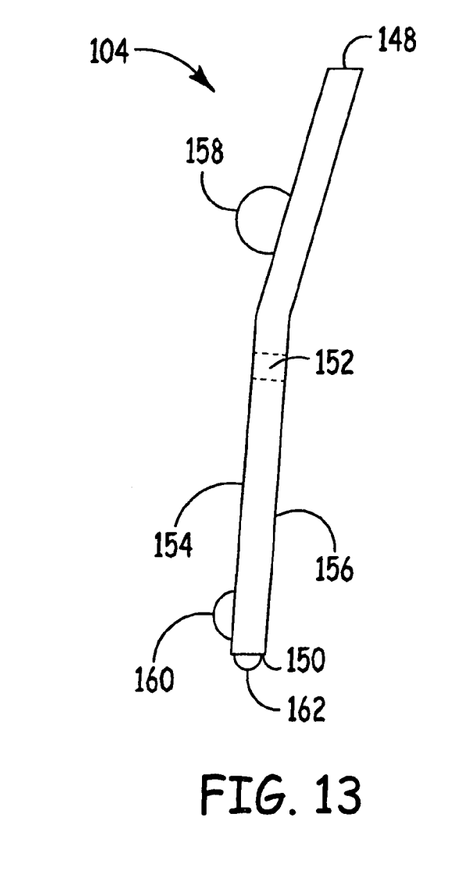
FIG. 13 is a side view of a rocker plate of the optoelectronic device integration tool of FIG. 11.
Figure 14:
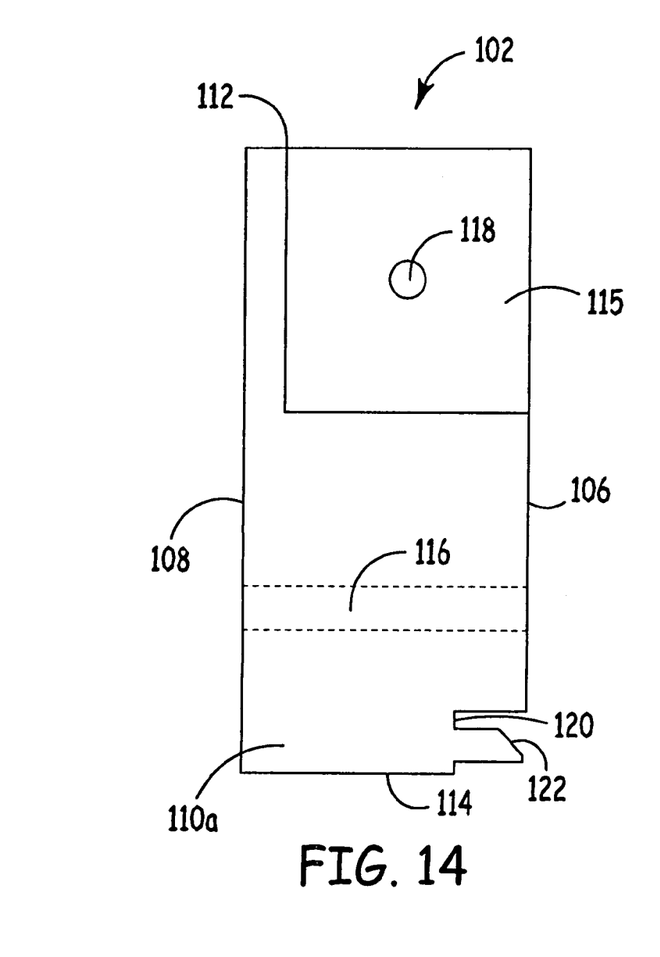
FIG. 14 is a side view of the clamp base of the optoelectronic device integration tool of FIG. 11.

An alternative embodiment of an optoelectronic device integration tool 100 is depicted in FIGS. 11–15. Optoelectronic device integration tool 100 comprises a clamp base 102, a rocker plate 104 and a rocker plate clamp frame 105. As illustrated in FIG. 14, clamp base 102 preferably includes many of the features previously described with respect to clamp base 22 and clamp base 82. More specifically, clamp base 102 is defined by a clamp surface 106, a fastener surface 108, a pair of side surfaces 110a, 110b, a top surface 112, a bottom surface 114 and a coupling surface 115. A connecting throughbore 116 extends from clamp surface 106 to fastener surface 108. Coupling surface 115 includes a coupling throughbore 118. Clamp surface 106 includes a recess 120 having a projecting clamp support 122 adapted for insertion into MT connector port 15 of the parallel optical transceiver package 12.

Figure 15:
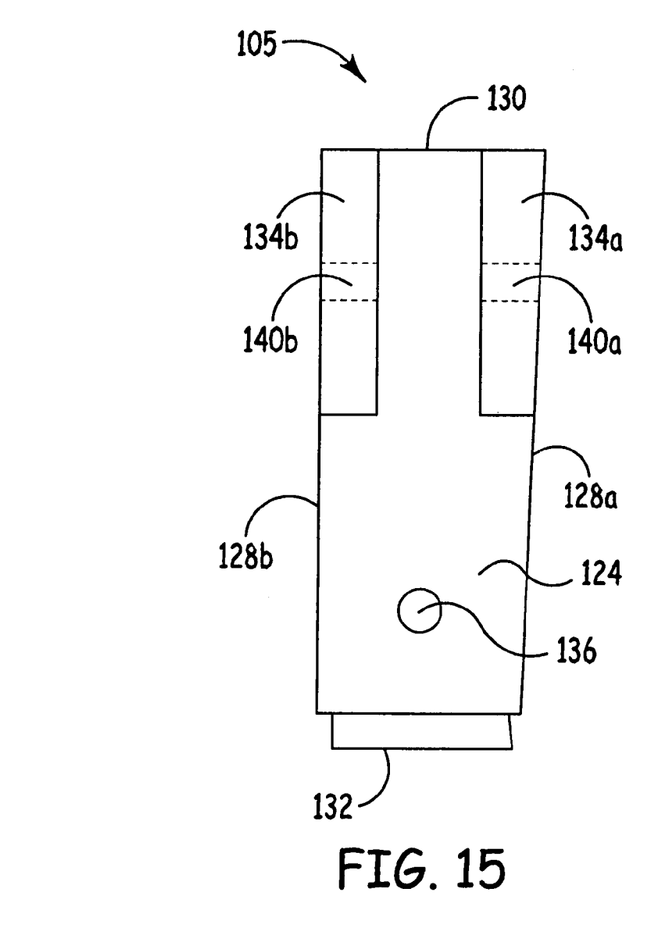
FIG. 15 is a front view of the rocker plate clamp frame of the optoelectronic device integration tool of FIG. 11.

Rocker plate clamp frame 105 preferably includes many of the features previously described with respect to spring clamp frames 25 and 85. As illustrated in FIG. 15, rocker plate clamp frame 105 is defined by a mounting surface 124, a biasing surface 126, a pair of side surfaces 128a, 128b, a top surface 130, a bottom surface 132 and a pair of opposed projecting arms 134a, 134b. Mounting surface 124 includes a connecting bore 136 corresponding to connecting throughbore 116. Biasing surface 126 includes a mounting bore 138. Projecting arms 134a, 134b include arm bores 140a, 140b. Bottom surface 132 includes a VCSEL recess 142 defined by a front wall 144 and a pair of side walls 146a, 146b.

As illustrated in FIG. 13, rocker plate 104 includes a biasing end 148, a positioning end 150 and at least one rocker throughbore 152 corresponding to mounting bore 138. Rocker plate 104 includes a rocker engagement surface 154 and a rocker mounting face 156. Rocker plate 104 further comprises a first resilient member 158, a second resilient member 160 and at least one-third resilient member 162. In a preferred embodiment, first resilient member 158, second resilient member 160 and third resilient member 162 comprise a dollop of cured silicone. Clamp base 102, rocker plate 104 and rocker plate clamp frame 105 are all preferably machined from aluminum or another metal suitable for use during bonding and alignment of the fiber optic assembly 18.

Figure 11:
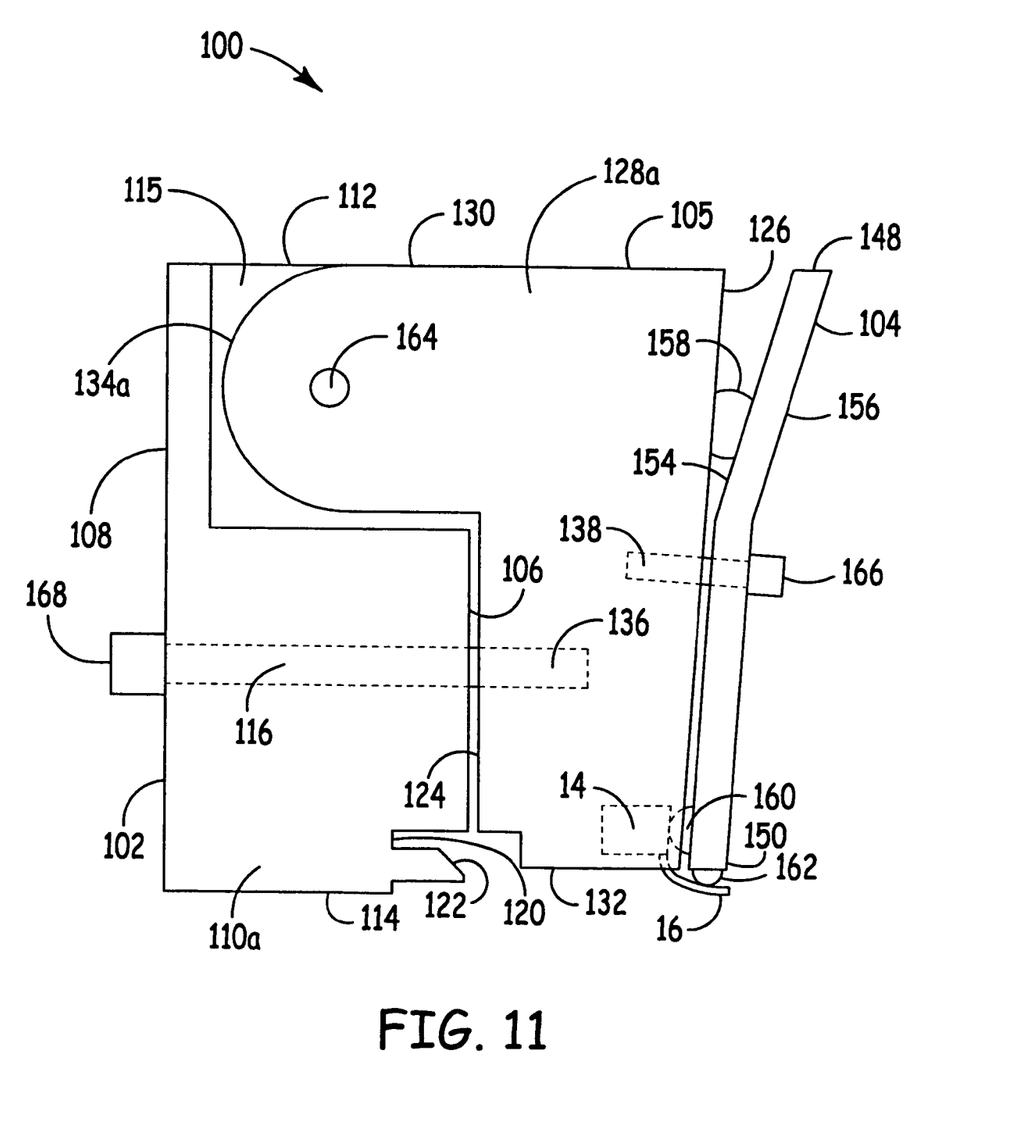
FIG. 11 is a side view of an embodiment of an optoelectronic device integration tool of the present invention.
Figure 12:
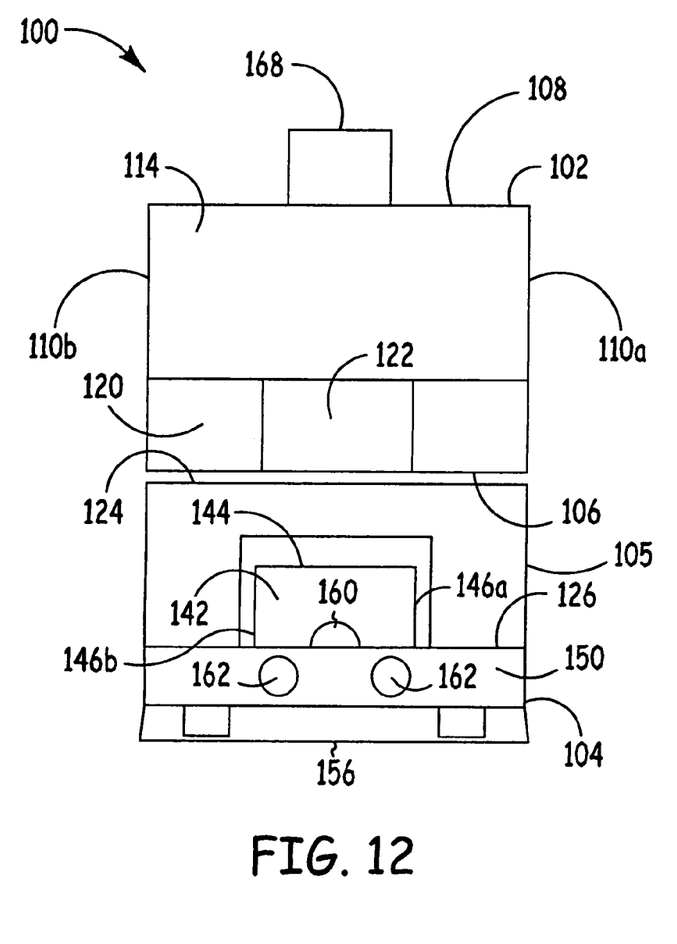
FIG. 12 is a bottom view of the optoelectronic device integration tool of FIG. 11.

Optoelectronic device integration tool 100 is assembled by first inserting a pivot member 164 through arm bore 140a, into coupling throughbore 118 and into arm bore 140b to pivotally connect the clamp base 102 and rocker plate clamp frame 105. Next, rocker plate 104 is attached to rocker plate clamp frame 105 by inserting a rocker fastener 166 through rocker throughbore 152 and into mounting bore 138.

In operation, the optoelectronic device integration tool 100 performs a similar function as previously described with respect to the optoelectronic device integration tools 10 and 80. In general, the parallel optical transceiver package 12 is disposed on a work surface (not shown). A user directs biasing end 148 of rocker plate 104 toward biasing surface 126 resulting in compression of first resilient member 158 and the withdrawal of second resilient member 160 from VCSEL recess 142. The VCSEL 14 is inserted into the VCSEL recess 142 and the user releases biasing end 148. Rocker plate 104 is designed to eliminate input forces on the VCSEL. First resilient member 158 pushes away from biasing surface 126 causing rocker plate 104 to rotate around rocker fastener 166 such that positioning end 150 approaches biasing surface 126 and second resilient member 160 fixedly positions VCSEL 14 against front wall 144 of VCSEL recess 142. Next, the optoelectronic device integration tool 100 is positioned such that projecting clamp support 122 is slidably inserted into MT connector port 15. Rocker plate clamp frame 105 is rotated downwardly around pivot member 164 such that the fastener screw 168 is then inserted through connecting throughbore 116 and into connecting bore 136. As fastener screw 168 is tightened, opto- electronic device integration tool 100 is clamped to parallel optical transceiver package 12. As fastener screw 168 is tightened, third resilient member 162 positions flexible circuit 16 against electronic substrate 26 as an adhesive sets and permanently bonds flexible circuit 16 and electronic substrate 26. Adhesive is applied prior to the positioning of flexible circuit 16 against electronic substrate 26, resulting in an adhesive surface well removed from the resilient member 162.

It is to be understood that the embodiments described herein are only illustrative and modifications of the various dimensions and materials can be made still within the spirit and scope of this invention.

The invention claimed is:

1. A parallel optical transceiver package assembly tool for integration of an optoelectronic device with a parallel optical transceiver package, said tool comprising:
    a clamp base;
    a rocker plate clamp frame pivotally connected to the clamp base, the rocker plate clamp frame having a mounting recess adapted to receive the optoelectronic device; and
    a rocker plate pivotally connected to the rocker plate clamp frame for positioning the optoelectronic device.

2. The parallel optical transceiver package assembly tool of claim 1 wherein the clamp base includes a projecting clamp support, said projecting clamp support disposed for insertion into a MT connector port defined by the parallel optical transceiver package.

3. The parallel optical transceiver package assembly tool of claim 1 wherein the rocker plate further comprises a plurality of resilient members.

4. The parallel optical transceiver package assembly tool of claim 3 wherein the plurality of resilient members includes a first resilient member, wherein said first resilient member rotatably biases a first end of the rocker plate such that a second end of the rocker plate is in proximity to the mounting recess.

5. The parallel optical transceiver package assembly tool of claim 3 wherein the plurality of resilient members includes a second resilient member and a third resilient member mounted in proximity to the second end such that the second resilient member frictionally retains the optoelectronic device within the mounting recess while the third resilient member promotes substantially parallel physical contact between a flexible circuit of the optoelectronic device and the parallel optical transceiver package.

6. The parallel optical transceiver package assembly tool of claim 1 wherein the rocker plate clamp frame is fixed to the clamp base by a single fastener.

7. The parallel optical transceiver package assembly tool of claim 1 wherein the rocker plate is pivotally connected to the rocker plate clamp frame by a pair of fasteners in a planar arrangement promoting a rocking motion about the axis.

8. The parallel optical transceiver package assembly tool of claim 1 wherein the optoelectronic device is a vertical cavity surface emitting laser.

\* \* \* \* \*